United States Patent [19]
Vallone

[11] 3,737,623
[45] June 5, 1973

[54] GROUNDED PROBE EJECTOR

[75] Inventor: Giacinto Vallone, Brockport, N.Y.

[73] Assignee: General Electric Company, Bridgeport, Conn.

[22] Filed: Oct. 14, 1971

[21] Appl. No.: 189,132

[52] U.S. Cl. .................. 219/441, 174/51, 174/78, 219/435, 337/32, 339/14, 339/45
[51] Int. Cl. .................................................. F27d 11/02
[58] Field of Search ................ 219/441, 442, 435; 174/51, 75 C, 78; 339/45, 14, 17, 95, 101, 110; 337/32, 377

[56] References Cited

UNITED STATES PATENTS

| 1,531,604 | 3/1925 | Gaynor | 339/101 X |
|---|---|---|---|
| 1,557,105 | 10/1925 | Thornton, Jr. | 339/45 |
| 1,775,564 | 9/1930 | Goodspeed | 339/110 X |
| 2,445,608 | 7/1948 | Detweiler | 339/45 |
| 2,484,558 | 10/1949 | Eisner | 174/51 X |
| 2,926,230 | 2/1960 | Foster | 337/377 X |
| 3,255,330 | 6/1966 | Mackenzie et al. | 337/32 |
| 3,417,214 | 12/1968 | Krehbiel | 200/51 |
| 3,440,405 | 4/1969 | Fowler | 219/441 |
| 3,573,695 | 4/1971 | Geyer et al. | 337/32 X |
| 3,587,021 | 6/1971 | Baumbach | 337/32 |

*Primary Examiner*—Volodymyr Y. Mayewsky
*Attorney*—Lawrence R. Kempton, John F. Cullen, Leonard J. Platt

[57] ABSTRACT

A detachable grounded probe control for an electric device, such as a skillet, the control being provided with an ejector movable against the skillet to disconnect and eject. The probe control has a fixed ground member and the ejector has an electrically conducting portion contacting the skillet the conducting portion being constantly biased against the ground member so the skillet is grounded through the ejector at all times.

8 Claims, 2 Drawing Figures

PATENTED JUN 5 1973 3,737,623

GROUNDED PROBE EJECTOR

BACKGROUND OF THE INVENTION

1. Field of the Invention

The invention herein pertains to a grounded probe control for a device such as a skillet and, more particularly, to a novel ejector assembly wherein the skillet is grounded at all times through the ejector structure.

2. Description of the Prior Art

It has become common in the small appliance field to provide an electric appliance with a removable probe control attached to an electric cord to avoid the need for individual controlling of each appliance. In cooking vessels, this probe control is a thermostat-controlled temperature regulating and sensing member that is removably attached to the cooking vessel to supply heating current and also support a temperature sensing tube to actuate electrical contacts and regulate the temperature of the vessel. The probe control may be usable with several appliances. It is difficult to remove the probe control when the vessel is hot since it is necessary to hold the hot vessel with one hand while pulling the control off with the other. To obviate this, electrical connectors or probe controls have been provided with ejectors to pop out the control or eject it. The ejector for a particular probe control may take a form as shown in U.S. Pat. No. 3,440,405 of common assignment or may simply be a sliding bar to force the connector out as shown in U.S. Pat. No. 1,531,604 if a flat probe control is used of the type shown in U.S. Pat. No. 2,926,230.

It is becoming more common to supply many electrical appliances with three-wire cords having grounding means for safety. Thus, if the housing of the appliance is inadvertently shorted, the device is immediately grounded. In grounded probe controls for electric skillets, the ground, when used, is generally through the temperature sensing tube that is inserted into the skillet for good heat transfer. One of the difficulties of grounding through the tube is that it is necessary to remove any anodized coating in order to provide a good electrical connection and, once the coating has been removed, the tube may oxidize and corrode to provide a poor surface for both heat transfer which is its main function and for grounding which is a back-up function. Additionally, there is always the possibility that the tube sensor can be insulated electrically by the cement that may be used at the junction of the tube and a thermostatic bracket customary in such thermostat-controlled and temperature regulating probes. Another scheme is to provide a spring biasing means in the skillet itself which actually pushes against the temperature sensing tube in order to be sure good electrical contact is made. However, this has the disadvantage of requiring modifications to the cooking vessel, introduction of calibration problems, and additional expense.

SUMMARY OF THE INVENTION

Briefly described, the present invention is directed to a detachable grounded connector such as a probe control for an electric device or utensil such as an electrically heated skillet which device has an exposed electrically conductive portion. The probe housing has an ejector in the form of a flat bar that is slidably guided within the probe and is formed of an electrically conducting portion at one end and a nonconducting actuating portion at the other end. The conducting portion of the bar is biased against a conductive portion of the utensil and the probe has provided a fixed grounded bracket member for supporting the thermostat and spaced from the bar ejector. There is provided means biasing the ejector conducting portion against the grounded member so the utensil is grounded through the ejector at all times. The particular grounding structure may conveniently be a sliding contact in the form of a cantilever finger struck out from the bar ejector parallel to the bar and offset therefrom a distance greater than the grounding bracket is spaced from the bar ejector whereby the finger is constantly biased against the bracket for a scraping action when the bar is actuated to eject the probe. Suitable spring means are provided as required. Thus, the main object of the invention is to provide a grounded probe control with an ejector where the grounding structure is through the ejector which is in contact with the electric device at all times.

DESCRIPTION OF THE PREFERRED EMBODIMENT

Figure 1:
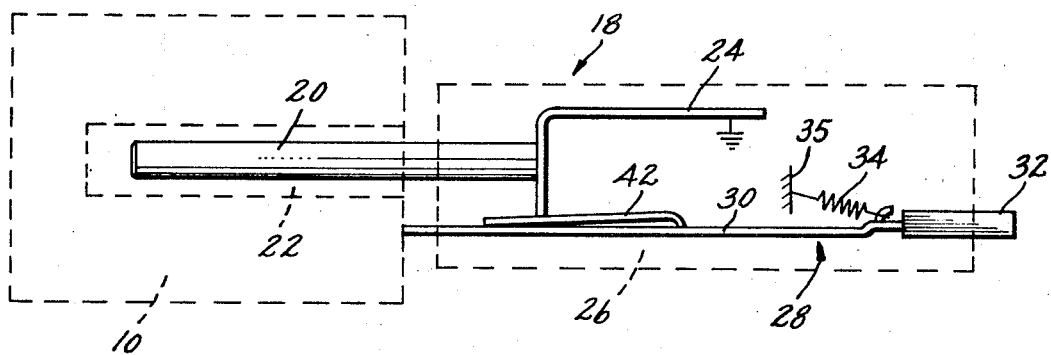
FIG. 1 is a diagrammatic view of a typical probe control illustrating the continuous grounding of the ejector.
Figure 2:
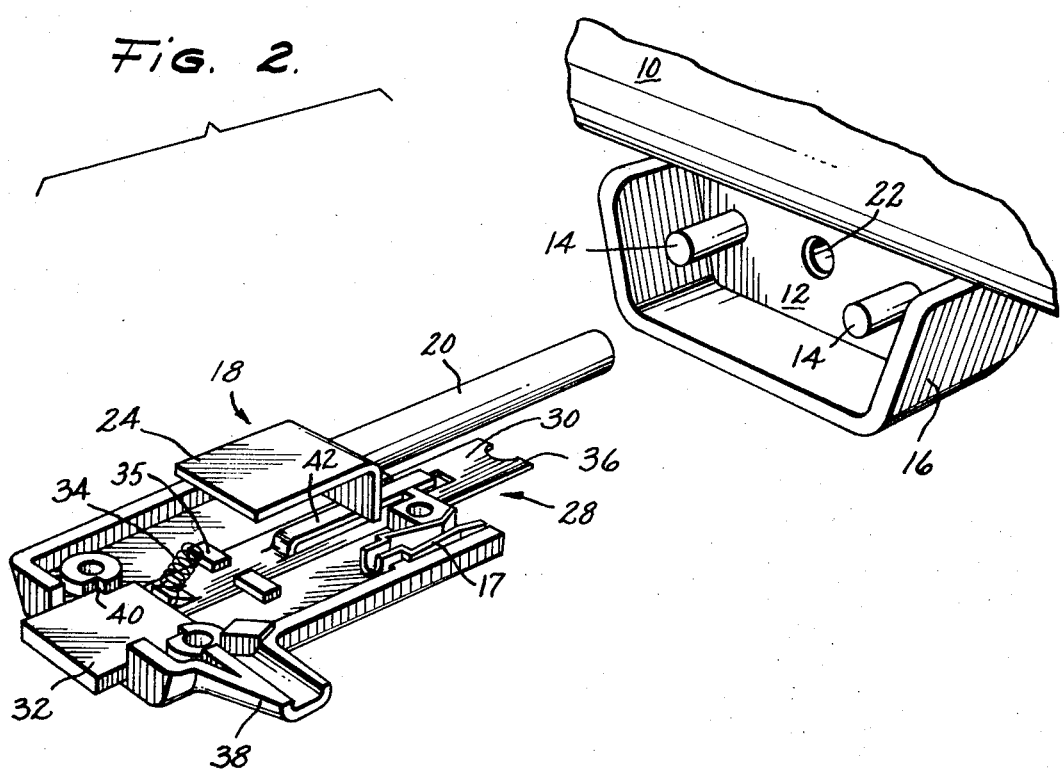
FIG. 2 is an exploded partial view of a probe control as applied to a skillet showing the grounded ejector structure.

It should be appreciated that the grounded ejector structure is usable with many electrical devices that might become electrically "hot" due to a short. For convenience, the invention is designed as used in an electrically heated utensil such as an electric skillet but is not so limited. Referring first to FIG. 1, there is shown a diagrammatic form of electric device 10 which, as noted, may be a skillet as shown in FIG. 2. A typical application of a flat probe thermostat control with a skillet is shown in the mentioned U.S. Pat. No. 2,926,230. Referring next to FIG. 2, the skillet 10 is generally provided with a bulkhead 12 that carries electrical terminals 14 which are protected by a plastic shield member 16 and which mate with electrical sockets 17 in the probe as is well-known. The temperature of the device is sensed and thermostatically controlled by the connector or probe control generally indicated at 18. This device is generally usable on several appliances and comprises a heat-sensing tube 20 that is inserted into tubular opening 22 and senses heat and activates the electrical contacts, not shown, that are usually carried by a fixed bracket member 24 by structure that is well-known in the art and fully explained in said U.S. Pat. No. 2,926,230. In the event of a malfunction or short it is possible for the device 10, when it has an exposed electrically conductive portion, to become electrically "hot" and therefore dangerous. It is known to use the heat sensor tube 20 as a grounding means as well as a temperature sensor and to ground the tube to bracket 24 which is then grounded by a three-wire conductor and thereby protect the user as shown in 1962 British patent 891,603. One of the difficulties with this means of grounding is that the tube 20 is usually anodized and this coating must be removed permitting it to oxidize and thus reduce its main function of temperature sensing by cutting down the heat transfer due to the poor oxidized surface. Additionally, a common way of connecting sensor tube 20 with bracket 24 is by means of an epoxy at the joint therebetween and this may form an insulating barrier to any electric path to ground. Also, the electrical device may be grounded by providing a spring member within skillet 10 to bias against sensor tube 20 but this requires additional structural features on the skillet and, unless the skillet has this, no positive grounding is obtained through the probe control 18 even if the probe is grounded.

In accordance with the invention, the positive grounding is obtained through a housing enclosed ejector structure to render the probe useful as a ground for any electrical device with which it is used. The internal structure is enclosed in any suitable known insulating housing 26 and the probe 18 has an ejector of any elongated form and preferably and conveniently in the form of a flat bar generally indicated at 28 that is longitudinally and slidably guided and supported within the probe housing as shown in FIG. 2. The bar ejector is formed of a long electrically conducting portion 30 at one end of the housing and protruding therefrom and also of an electrically nonconducting protruding actuating or finger portion 32 at the other end. These portions will generally be metallic and plastic, each protruding only from its respective end. In order to provide good biting constant contact at all times with the device or utensil to be grounded, the bar ejector is biased by spring means 34 connected to bar ejector 28 at one end and to housing portion 35 at the other end as shown to bias the bar to the right as shown in FIG. 2. The end surface 36 of conducting portion 30 may be any suitable biting or tooth shaped in order to ensure a constant good grounding contact with bulkhead 12 or its equivalent. When the probe is inserted into operating position it can be seen that the bar ejector 28 is moved to the left by contact of surfaces 36 and 12 and is constantly urged into such contact by spring 34. A thumb or finger action on the insulated portion 32 in conjunction with fingerhold 38 ejects the entire probe control from the skillet 10. The ejector is constantly biased to the right by spring 34 against stops 40 in the housing and is thus retained therein with the stops limiting protrusion of the conducting portion. The customary three-conductor grounding wire, not shown, is brought in through fingerhold 38 and connected in known fashion with the grounding wire connected to bracket 24 as shown in FIG. 1.

In order to provide a positive and continuous grounding of the skillet and provide this through the ejector at all times, the conducting portion 30 of the bar ejector 28 is provided with an extended sliding contact 42 which is conveniently formed as a cantilever finger that is struck from the conducting portion of the bar ejector so that it is parallel to the bar and offset therefrom as shown in FIG. 2. The positive and continuous grounding is obtained by spacing the grounded bracket 24 from the bar ejector any suitable given distance and then providing the offset of the sliding contact 42 a greater distance than the bracket spacing so that the sliding contact is biased against the bracket and actually bent slightly as shown in FIG. 1. Thus, when the ejector is actuated the sliding contact 42 is actually scraped along the bottom of the bracket 24 to provide a continuous, self-cleaning, and positive good ground against the bracket at all times.

The probe control just described has a simple and continuous positive grounding structure through the ejector. Thus, it is useful with any electrically heated utensil or any appliance or electrical device with which the probe may be used and which has a potentially electrically hot surface against which bar ejector 28 may bear. No modifications to the electrical device are required and no reliance on the heat sensor tube 20 as a ground is required. Thus, the grounded probe, since it is usable with all devices, may be used in any changeover schedule as grounded devices are phased into production.

While there has been described a preferred form of the invention, obvious equivalent variations are possible in light of the above teachings. It is therefore to be understood that, within the scope of the appended claims, the invention may be practised, otherwise than as specifically described, and the claims are intended to cover such equivalent variations.

I claim:

1. A detachable grounded connector for an electric device wherein said connector has an ejector movable relative thereto and against said device to disconnect therefrom, said ejector having an electrically conducting portion constantly contacting said device and a nonconducting actuating portion, a fixed grounded member in said connector, and means biasing said conducting portion continuously against said fixed member, whereby said device is grounded through said ejector at all times.

2. Apparatus as described in claim 1 wherein said conducting portion comprises, a bar slidably guided within said connector and protruding therefrom, and an extended sliding contact on said conducting portion biased against said grounded member at all times.

3. Apparatus as described in claim 2 having stop means limiting protrusion of said bar, and means biasing said bar against the stop.

4. Apparatus as described in claim 3 wherein said fixed grounded member is spaced from the bar, said sliding contact comprising a cantilever finger struck from the bar parallel thereto and offset therefrom a distance greater than said member spacing, whereby the finger is constantly biased against said member for a scraping action when said bar is actuated.

5. A detachable grounded probe control for an electrically heated utensil having an exposed electrically conductive portion wherein said probe includes a housing having an ejector movable against the utensil to eject therefrom, said ejector having an electrically conductive portion at one end biased constantly against a like portion of said utensil and a nonconducting actuating portion at the other end, a fixed grounded bracket member for supporting the probe thermostat therein, and means biasing said ejector conducting portion continuously against said member, whereby said utensil is grounded through said ejector at all times.

6. Apparatus as described in claim 5 wherein said ejector comprises, a flat bar slidably guided within the probe housing and having the conducting and non-conducting portions only protruding from opposite ends thereof, and an extended sliding contact on said conducting portion biased against said grounded member at all times.

7. Apparatus as described in claim 6 having stop means limiting protrusion of said bar conducting portion, and spring means biasing said bar against the stop.

8. Apparatus as described in claim 7 wherein said fixed grounded bracket is spaced from the bar, said sliding contact comprising a cantilever finger struck from the bar parallel thereto and offset therefrom a distance greater than said bracket spacing, whereby the finger is constantly biased against said bracket for a scraping action when said bar is actuated.

* * * * *